United States Patent [19]
Skeie

[11] Patent Number: 5,148,503
[45] Date of Patent: Sep. 15, 1992

[54] APPARATUS AND METHOD FOR LINEARIZED CASCADE COUPLED INTEGRATED OPTICAL MODULATOR

[75] Inventor: Halvor Skeie, San Jose, Calif.

[73] Assignee: Crystal Technology, Inc, Palo Alto, Calif.

[21] Appl. No.: 706,911

[22] Filed: May 29, 1991

[51] Int. Cl.$^5$ .......................... G02B 6/10; G02F 1/00
[52] U.S. Cl. .......................................... 385/3; 385/16
[58] Field of Search .............. 350/96.14, 96.13, 96.12, 350/96.11; 385/3, 1, 4, 2, 9, 16, 22

[56] References Cited

U.S. PATENT DOCUMENTS

| | | | |
|---|---|---|---|
| 4,223,977 | 9/1980 | Papuchon et al. | 350/96.12 |
| 4,390,236 | 6/1983 | Alferness | 350/96.14 |
| 4,882,775 | 11/1989 | Coleman | 455/617 |
| 4,932,736 | 6/1990 | Su | 350/96.14 |
| 4,934,775 | 6/1990 | Koai | 350/96.14 |
| 4,934,776 | 6/1990 | Koai | 350/96.14 |
| 4,936,645 | 6/1990 | Yoon et al. | 350/96.14 |
| 4,947,170 | 8/1990 | Falk | 350/96.14 |
| 4,993,798 | 2/1991 | Thylen | 350/96.15 |
| 4,997,245 | 3/1991 | DuPuy et al. | 350/96.14 |
| 5,002,353 | 3/1991 | Johnson | 350/96.14 |
| 5,010,346 | 4/1991 | Hamilton et al. | 341/137 |
| 5,015,053 | 5/1991 | Johnson | 350/96.14 |

OTHER PUBLICATIONS

Z. Q. Lin and W. S. C. Chang, "Waveguide Modulators with Extended Linear Dynamic Range a Theoretical Prediction", *Photonics Technology Letters*, vol. 2, No. 12, Dec. '90.

Pao-Lo Liu, B. J. Li, and Y. S. Trisno, "In Search of a Linear Electro-optic Amplitude Modulator", SPIE Conference, 1990.

R. D. Childs and D. A. O'Byrne, "Predistortion Linearization of Directly Modulated DFB Lasers and External Modulators for AM Video Transmission", *OFC* 90, 1990

*Primary Examiner*—John D. Lee
*Assistant Examiner*—Phan Thi Heartney
*Attorney, Agent, or Firm*—Jeffrey P. Morris; Joseph S. Codispoti

[57] ABSTRACT

A Y-branch type first interferometric modulator, and a coupler structure type second interferometric modulator are connected in cascade. The levels of DC bias voltages applied to the first and second interferometric modulators, respectively, are adjusted for maximizing the linearity of a modulated output light signal. The configuration of input and output coupler structures of the second interferometric modulator are predetermined for also contributing to maximizing the linearity of the output signal.

23 Claims, 4 Drawing Sheets

APPARATUS AND METHOD FOR LINEARIZED CASCADE COUPLED INTEGRATED OPTICAL MODULATOR

FIELD OF THE INVENTION

This invention relates generally to modulators, and more particularly to a method and apparatus for the linearization of integrated electro-optical modulators.

BACKGROUND OF THE INVENTION

Integrated electro-optical modulators are finding increasing use in state-of-the-art analog optical-fiber communication systems. Such systems are being developed as an alternative to conventional electromagnetic transmission lines. Present optical-fiber communication systems may consist of a high power, low noise laser source in conjunction with a wide bandwidth external modulator, for example. A common problem in such systems is that the dynamic range thereof is limited by intermodulation distortion, and by harmonic distortion due to modulator nonlinearities. Many attempts have been made in the art to improve the linearity of the modulators.

One method of improving the linearity of optical modulators is to provide electromagnetic predistortion of the input signal. A system for accomplishing this is reported in an article by R. P. Childs and D. A. O'Byrne, that appeared in OFC 90, entitled "Predistortion Linearization of Directly Modulated DFB Lasers and External Modulators for AM Video Transmission."

There are many examples of electro-optical modulators, demodulators, and modulating systems in the art. A number of such prior systems are briefly discussed below.

Johnson U.S. Pat. Nos. 5,015,053 and 5,002,355 refer to linearization of an interferometric modulator by coupling to transverse electric (TE) and transverse magnetic (TM) modes. A carrier wave derived from a light source is polarized by a polarizer for adjusting the power of the carrier wave in the TE and TM polarization modes.

Hamilton et al. U.S. Pat. No. 5,010,346 shows an electro-optical analog-to-digital converter. A laser light source is synchronized with a digital clock for producing pulses of light. The pulses of light are modulated by an optical modulator for varying the intensity of the pulses of light as a function of the amplitude of the analog modulating signal. The light pulses are demultiplexed and passed through a detector for converting the light pulses to electrical signals. The electrical signals are then passed through an electrical analog-to-digital converter.

DuPuy et al U.S. Pat. No. 4,997,245 shows optical switches that are polarization independent. The optical switches include a substrate of electro-optic material in which waveguides are formed in a manner permitting light waves to be switched therethrough independent of polarization phenomena.

Thylen U.S. Pat. No. 4,993,798 refers to an optical communication system consisting of a semiconductor laser that includes an optical waveguide coupled at one end to first and second optical directional switches. The other ends of each one of the directional couplers each have an end of a waveguide terminated to a mirror, for forming a cavity including the laser diode. By either modulating current driving the diode, or by applying a modulating signal to the directional couplers, a light signal passing therethrough can be modulated.

Yoon et al U.S. Pat. No. 4,936,645 shows a polarization-insensitive Mach-Zehnder modulator that includes a thin film waveguide on a substrate. The modulator consists of a lamination of different organic polymers upon which the thin film waveguide is deposited, and electrodes for applying voltages for producing electric fields to coact with the light passing through the waveguides.

Koai U.S. Pat. No. 4,934,776 teaches the combination of cascaded individual waveguide directional coupler sections arranged to provide a high-density optical data array, for forming an integrated optical intensity modulator. The cascaded coupled-waveguide modulators provide ultra-high extinction ratios.

Koai U.S. Pat. No. 4,934,775 shows an optical space-division switching architecture consisting of high-extinction electro-optical data arrays of a plurality of cascaded coupled-waveguide optical intensity modulators. A plurality of passive splitter circuits are used to evenly divide an input optical signal into a plurality of interim optical signals. The optical signals are passed through the optical intensity modulators, respectively, which have waveguide coupler sections cascaded together on a crystal substrate to form a bar-type modulator structure, for providing a direct optical connection between the various sections of each modulator. Combiner circuits receive the output optical signals from the data arrays and combine them for providing a single output wave or signal.

Su U.S. Pat. No. 4,932,736 teaches the monolithic integration of three integrated waveguide couplers to provide a 1×2 or 2X1 integrated optical switch with a high extinction ratio. In the switch a first waveguide coupler has its output directly coupled to the input ports of the other two waveguide couplers via an integrated waveguide. As a result, two cascaded integrated waveguide couplers are provided along each path from a single input port to two output ports, respectively.

Coleman U.S. Pat. No. 4,882,775 shows a demodulator provided by an interferometer and a signal processor. The demodulator is included in a coherence multiplexed, optical data transmission system. The optical data transmission system includes an interferometric modulator at an input end. The output signals therefrom are modulated waveforms which are passed through an optical multiplexer, and coupled via single mode optical couplers and a fiber optic cable to demodulator stages. Each modulator and demodulator stage is provided by an unequal arm-length Mach-Zehnder interferometer. The multiplexers phase modulate the optical carriers from the modulators for multiplexing the same together. The path lengths between the modulators and demodulators included in the system are controlled for obtaining a desired output from the output demodulator stages 40.

Alferness U.S. Pat. No. 4,390,236 shows an electro-optical demultiplexer consisting of a plurality of cascaded tunable, polarization independent optical wavelength filters. The various sections of the filters, as cascaded, provide an input polarization selective coupler that separates the transverse electrical (TE) and transverse magnetic (TM) orthogonally polarized wave components, respectively, of an arbitrarily polarized input signal. The separated TE and TM components then travel along two different wavepaths or waveguides. Each waveguide includes a wavelength selective mode converter. An output polarization selective coupler is provided for combining in one output waveguide signal components centered about the wavelength of the mode converters, and for combining in a second output waveguide the balance of the input signal.

Papuchon U.S. Pat. No. 4,223,977 shows an integrated optical circuit for separating a plurality of optical waves of different wavelengths, thereby providing a demultiplexing function. A plurality of basic electro-optical cells are integrated on a single substrate for providing the optical demultiplexing circuit.

A paper entitled "Waveguide Modulators with Extended Linear Dynamic Range a Theoretical Prediction" (Z. Q. Lin and W. S. C. Chang, *Photonics Technology Letters*, Vol. 2, No. 12, Dec. '90) shows a modified-directional-coupler modulator with reduced nonlinear distortion. The coupler includes an input stage for receiving input signals for a voltage control directional coupler that couples the signals to a Mach-Zehnder interferometer. The output of the interferometer is coupled by a fixed directional coupler to an output waveguide providing two channels. The parameters are adjusted for minimizing third order intermodulation spurious signals.

A paper entitled "In Search of a Linear Electro-optic Amplitude Modulator" (Pao-Lo Liu, B. J. Li, and Y. S. Trisno, SPIE Conference, 1990) shows a linear electro-optic amplitude modulator. The modulator includes a Y-branch for dividing an optical input signal equally for inputting into the two arms, respectively, of a Mach-Zehnder interferometer. The interferometer functions as a phase shifter. The output of the interferometer is supplied to a directional coupler having a nominal coupling constant-length product of half a coupling length. The optical output signal is provided at each of two output waveguides. A modulation signal of one polarity is applied to the interferometer phase shifter, and is applied in reverse polarity to the directional coupler using a multiplication factor. The parameters are adjusted for optimizing the linearity of the modulator by reducing the second and third order harmonics that cause nonlinearities to occur.

The present inventor recognized that known integrated optics modulators require further improvement. One need recognized is to improve the linearity of integrated optical modulators.

SUMMARY OF THE INVENTION

An object of the present invention is to provide an improved integrated optical modulator.

Another object of the invention is to provide an integrated optical modulator having increased linearity.

These and other objects of the invention to overcome the problems in the prior art and satisfy the identified need are provided in one embodiment of the invention by an integrated optical modulator having a plurality of cascaded stages of Mach-Zehnder type Y-branch configured interferometric modulators and coupler structure interferometric modulators. The amplitude of the modulating voltage applied to each stage, and the level of the DC bias applied to each stage, are adjusted for increasing the linearity of the modulated output signal. In another embodiment of the invention, various ones of the stages may each be provided by a 2X1 interferometric switch.

BRIEF DESCRIPTION OF THE DRAWINGS

Various embodiments of the present invention are illustrated below in conjunction with the accompanying drawings, wherein like items are identified by the same reference designation, and in which.

DETAILED DESCRIPTION OF PREFERRED EMBODIMENTS OF THE INVENTION

Figure 1:
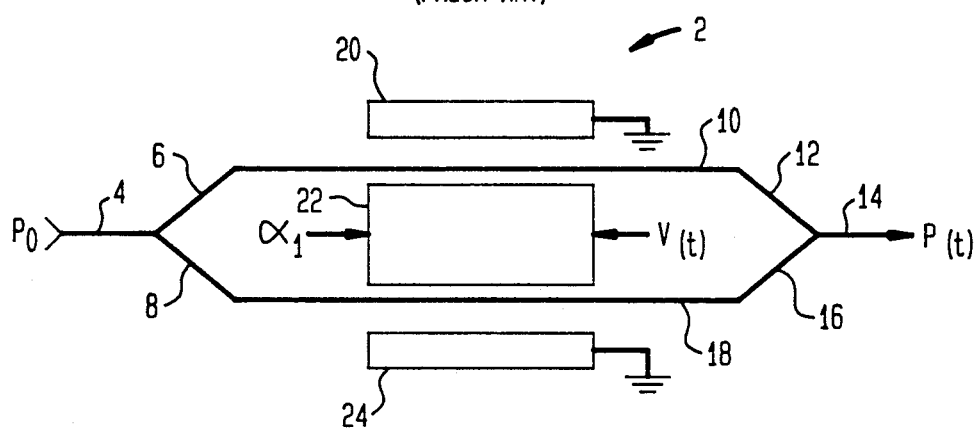
FIG. 1 is a simplified pictorial diagram of a known Y-branch interferometric modulator.

Before describing the various embodiments of the invention in detail, it may be helpful to review Mach-Zehnder standard interferometric modulators known in the prior art. For example, in FIG. 1 a Y-branch electro-optical interferometric modulator 2 is shown. An input light wave $P_0$, typically having a power level expressed in milliwatts, is applied to an input waveguide 4, for carrying the light wave $P_0$ to be divided into upper waveguide segment 6 and lower waveguide segment 8 of the Y-waveguide 4, 6, 8. Light from the upper segment 6 travels through a longitudinal upper waveguide segment 10, through an upper waveguide segment 12, and through an output waveguide segment 14 for providing a portion of an output light signal $P_{(t)}$. A lower leg or waveguide segment 16 forms a Y-branch with waveguide segments 14 and 16. Waveguide segment 16 receives light from a lower longitudinal waveguide segment 18 at one end thereof, the other end of the latter being connected to receive light from an end of the lower waveguide segment 8. Note that waveguide segments 4, 6, 10, 12 and 14 form a continuous waveguide, as do waveguide segments 4, 8, 18, 16 and 14.

An elongated relatively narrow metal electrode 20 is positioned relatively close to the top of the upper longitudinal waveguide segment 10, with the longitudinal axis of each being parallel. Another electrode 22 that is rectangular in shape, but substantially wider than electrode 20, in this example, is located between the upper and lower longitudinal waveguide segments 10 and 18 with its longitudinal axis parallel thereto. A third electrode 24 substantially identical in shape to electrode 20 is located beneath waveguide segment 18, with the longitudinal axes of the two being parallel. Electrode 24 has substantially the same shape as electrode 20, with these electrodes and electrode 22 all being juxtaposed and in vertical alignment with one another, in this example. A modulating or instantaneous voltage V(t) is connected to electrode 22. The upper and lower electrodes 20 and 24 are each connected to a source of reference potential, ground in this example. A DC bias voltage $\alpha_1$, is also connected to electrode 22. These elements are typically formed on a lithium niobate crystal substrate 82 (see FIG. 5), with the waveguide segments 4, 6, 8, 10, 12, 14, 16, and 18 being formed by diffusing titanium into the substrate 82. Electrodes 20, 22, and 24 are deposited on top of the substrate 82. Note that the shape of any of the electrodes illustrated above are not meant to be limiting in that many shapes or configurations can be used for the electrodes.

A light signal $P_0$ applied to input waveguide 4 is substantially equally divided. One half portion travels through waveguide segments 6, 10, 12, and another half portion travels through waveguide segments 8, 16, and 18, as indicated above. Light traveling through waveguide segment 10 passes between electrodes 20 and 22, and the light through waveguide segment 18 passes between electrodes 22 and 24. The modulating signal V(t) causes the index of refraction of the crystal substrate 82 to change for increasing the speed of light through waveguide 10, and decreasing the speed of light through waveguide 18, for example, in accordance with the instantaneous amplitude at any given time of the modulating signal V(t). The phase difference created between the light traveling through the upper waveguide 10 and lower waveguide 18 modulates the light. The light from waveguide 10 then travels through waveguide 12 to output waveguide 14, and light from waveguide 18 through waveguide 16 to waveguide 14, whereby the two portions of the original light signal $P_0$ are combined together to form the modulated output light signal $P_{(t)}$. The output light signal $P_{(t)}$ includes only the in-phase components of the modulated light, in that in a Y-branch modulator components of light that are in phase quadrature are absorbed in the crystal substrate 82, in this example.

The known interferometric modulator of FIG. 1 has the following transfer function:

$$P_{(t)} = P_0/2[1 + \cos(\phi(t) + \alpha)] \qquad (1)$$

where $\phi(t)$ is proportional to the input signal voltage V(t), while $\alpha$ is proportional to the level of the DC bias voltage $\alpha_1$, in this example.

Figure 2:
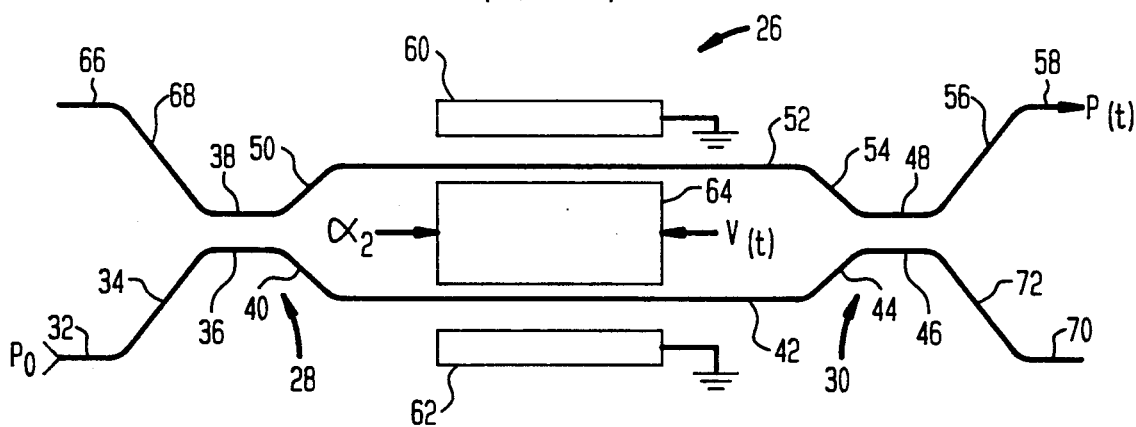
FIG. 2 is a simplified pictorial diagram of a known coupler structure interferometric modulator.

Another known interferometric coupler structure for providing a Mach-Zehnder interferometric modulator 26 is shown in FIG. 2. The difference between the configuration of interferometric modulator 26 and that of modulator 2 is that the former includes waveguide coupling sections 28 and 30. More specifically, in the configuration of interferometric modulator 26, a light wave $P_0$ signal is delivered to a lower input waveguide segment 32 that lies relatively in a substantially horizontal plane, with the light being conducted therefrom through an upward sloping waveguide segment 34, and therefrom through a lower horizontal waveguide segment 36 of a coupling section 28. A portion of the light traveling through the lower horizontal waveguide segment 36, ideally has half of its light energy coupled into the upper horizontal waveguide portion 38 of coupler 28. The remaining light from waveguide 36 then travels through the downward sloping waveguide section or segment 40, therefrom through the lower longitudinal waveguide segment 42, then through an upwardly sloping waveguide segment 44 and into a horizontal lower waveguide segment 46 of a second coupler 30. The latter also includes an upper horizontal waveguide segment 48. Light coupled from lower horizontal waveguide segment 36 of coupler 28, coupled into the upper horizontal segment 38, travels from the latter to an upwardly sloping waveguide segment 50, through an upper longitudinal waveguide segment 52, into a downwardly sloping waveguide segment 54, and therefrom into the upper horizontal waveguide segment 48 of coupler 46, where this light is combined with light coupled thereinto from the lower horizontal waveguide segment 46 of this coupler. Both the linear and nonlinear components of the light wave signals combined in waveguide segment 48 travel therefrom through an upwardly sloping waveguide segment 56 to a horizontal waveguide segment 58, for outputting therefrom as an output light signal $P_{(t)}$, in this example.

A relatively narrow rectangular electrode 60 is positioned above the upper longitudinal waveguide segment 52, and a similar electrode 62 is positioned below lower longitudinal waveguide segment 42. A third electrode 64 that is substantially wider than either of electrodes 60 and 62, in this example, is positioned between the upper and lower longitudinal waveguides 52, 42, respectively. The electrodes 60, 62, and 64 are juxtaposed and substantially in alignment with one another. Note also that the lower waveguide segment 32 has a corresponding upper waveguide segment 66 that continues into a downwardly sloping upper waveguide segment 68. Also, the upper output waveguide segment 58 has a corresponding lower waveguide segment 70, with the latter connecting with a downward sloping lower waveguide segment 72, as shown. Also, as previously indicated, the electrodes can have other configurations than those illustrated herein.

The operation of the coupler structure interferometric modulator 26 is similar to that of the Y-branch interferometric modulator 2 of FIG. 1. However unlike the latter which absorbs the phase quadrature components of the output wave form in the crystal substrate 82, the coupler structure modulator 26 does not absorb these phase quadrature components. Therefore, the coupler interferometric modulator 26 tends to provide a higher output light signal $P_{(t)}$. The transfer function for the coupler structure interferometric modulator 26 can be the same as the Y-branch interferometric modulator 2, as given in equation (1) above. However, if the couplings 28 and 30 are varied, a slightly modified transfer function results as shown below in equation (2):

$$(2) \; P_{2(t)} = \tfrac{1}{2}(1+c) \cdot [1 - (1-c)/(1+c) \cos(\phi_2(t) + \alpha_2)] \qquad (2)$$

where the output waveform light signal denoted by $P_{2(t)}$ is representative of the output signal of modulator 26, $\phi_2(t)$ is the phase angle in radians and is proportional to signal voltage V(t), $\alpha_2$ is a phase angle representative of the DC bias applied to electrode 64, the DC bias being typically in units of volts, and c is a measure of the couplings 28 and 30, and is typically a complex number having no units, as is known in the art.

Assume that modulator 2 and modulator 26 are configured for each having the transfer function of equation (1). Also, note further that $\phi(t)$ is also representative of the phase difference between the two light signals modulated as described in either one of the modulators 2 and 26. Accordingly, the nonlinearity of either the modulators 2 or 26 can be described by approximating equation 1 as shown below in equation (3):

$$P_{(t)} \approx P_0/2 \; [1 + \cos \alpha - \sin \alpha \cdot \phi(t) - \tfrac{1}{2} \cos \alpha \cdot \phi^2(t) + 1/6 \sin \alpha \cdot \phi^3(t) + \text{higher order terms}] \qquad (3)$$

Note that the cosine expression including $\phi^2(t)$ is representative of a second order harmonic, with the following term being a third order harmonic, and so forth. If the bias voltage represented by the phase angle α, in this example, has a level of ±π/2, even order terms in equation (3) will vanish.

The present inventor recognized that compensation for nonlinearities due to second, third, and higher order harmonics can be obtained when suitable combinations of the transfer functions of equations 1 and 2 are implemented. The present invention provides such suitable combinations of these transfer functions by cascade coupling two or more interferometric modulators such as some combination of modulators 2 and 26 of FIGS. 1 and 2, respectively, whereby a total transfer function is obtained as shown below in equation (4):

$$P_{(t)} = P_0/2 \; [1 + \cos(\phi_1(t) + \alpha_1)] \Gamma_{11}[1 + \Gamma_{21} \cos (\phi_2(t) + \alpha_2)] \ldots \Gamma_{1n} [1 + \Gamma_{2n} \cos(\phi_n(t) + \alpha_n)] \quad (4)$$

$\Gamma_{1n}$, $\Gamma_{2n}$ depends on the coupling C, $\phi_n(t)$ is proportional to V(t) but with n dependent proportionality constants (sensitivity). By optimizing the coupling parameters $\Gamma_2 \ldots \Gamma_n$, bias angles $\alpha_1 \ldots \alpha_n$, and weighting ratios $\phi_2(t)/\phi_1(t) \ldots \phi_n(t)/\phi_1(t)$, n number of higher order harmonic terms can be minimized.

Figure 3:
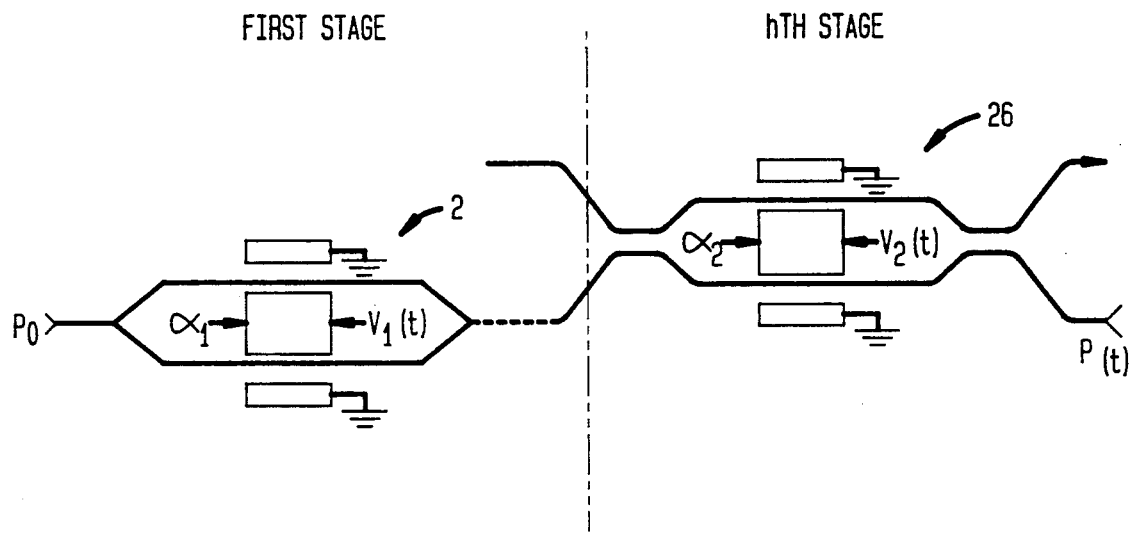
FIG. 3 is a simplified pictorial diagram of one embodiment of the invention.
Figure 4:
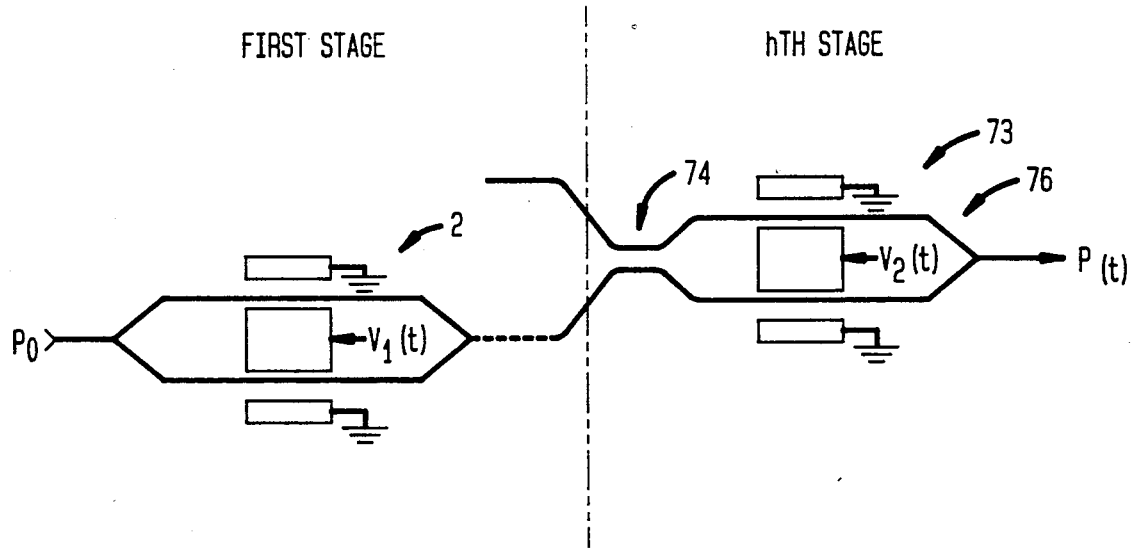
FIG. 4 is a simplified pictorial diagram of another embodiment of the invention.

In FIG. 3 a cascade of n stages (n=2, 3, 4 . . .) of interferometric modulators is shown that will provide the transfer function of equation 4. For the sake of simplicity, assume that n=2, providing two cascaded stages. In this example, a first stage is a Y-branch interferometric modulator 2, and a second stage is a coupler-structure interferometric modulator 26, as shown in FIG. 3. In another embodiment of the invention, as shown in FIG. 4, assuming that n=2, the first stage or input stage is also a Y-branch interferometric modulator 2, whereas the second or output stage is shown as 2X1 switch or interferometric modulator 73 that includes a coupler input section 74 and a Y-branch output section 76, instead of a coupler output section 30 as in interferometric modulator 26.

To derive an optimally linearized modulation of light for either of the assumed two stage configurations of FIGS. 3 and 4, assume the equations shown below as equation 5 and equation 6, where $k_n$ is a proportionality constant related to voltage and phase in the stages.

$$\phi_1(t) = k_1 V(t) \quad (5)$$

$$\phi_n(t) = k_n V(t) \quad (6)$$

Next consider the Taylor expansion as shown below in equation 7:

$$P(V_{(t)}) = P(o) + P'(o) \cdot V_{(t)} + \tfrac{1}{2} P''(o) \cdot V^2(t) + 1/6 \, P'''(O) \cdot V^3(t) \ldots + 1/n! P^{(n)}(O) \cdot V^n(t) \quad (7)$$

wherein $$P^{(n)} = d^n P / (dV)^n \quad (8)$$

By setting P''(O)=O; P'''(O)=); up to P(n)(O)=O, a system of equations containing the parameters $\Gamma_{11}, \Gamma_{21} \ldots \Gamma_{1n}, \Gamma_{2n}; k_1 \ldots k_n; \alpha_1 \ldots \alpha_n;$ can be found.

For certain ranges of parameter values, the system of equations can be solved to yield an optimally linearized modulation. For the two stage cascaded configurations of interferometric modulators of FIGS. 3 and 4 of two embodiments of the invention, respectively, each configuration can be described as shown below in equation 9:

$$P(t) = P_0/4 \; (1 - \sin(x + \alpha_1)) \cdot C_1 \cdot [1 + C_2 \sin(kx + \alpha_2)] \quad (9)$$

It can be shown that $x = k_1 \cdot V(t)$, where $k_1$ is a proportionality constant referring to voltage and phase, C1 is related to coupling 28, C2 is related to coupling 30, and k is representative of a ratio between the voltage applied to the second stage (26 or 72) versus the voltage applied to the first stage 2 of the cascaded interferometric modulators of FIGS. 3 or 4. Note that in the embodiment of FIG. 4, C1 equals 1.0, whereas in the embodiment of FIG. 3 $C_1$ can be greater than 1.0, whereby the latter embodiment yields a slightly better light throughput than the embodiment of FIG. 4.

Assume that the equivalents shown in equations 10, 11 and 12 are set as shown below:

$$\alpha_1 = 0 \quad (10)$$

$$d^2 P(t)/dx^2 = 0 \text{ and} \quad (11)$$

$$d^3 P(t)/dx^3 = 0 \quad (12)$$

From equations 9 through 12, the parameter relationships of equations 13 and 14 shown below can be found:

$$\tan \alpha_2 = -2/k \quad (13)$$

and $$C2 = \sqrt{(4 + k^2)/(k^4 + 6k^2 + 2)} \quad (14)$$

Accordingly, from the above mathematical analysis, the parameters for obtaining a particular transfer function for the interferometric modulator of FIGS. 3 and 4 can be found. Note that to a practical limit, a linearized interferometric modulator can be provided by cascading some combination of a plurality of the modulator configurations 2, 26, and 73, or 2 and 26, or 2 and 73, or 26 and 73, or all of one type, for example.

Figure 5:
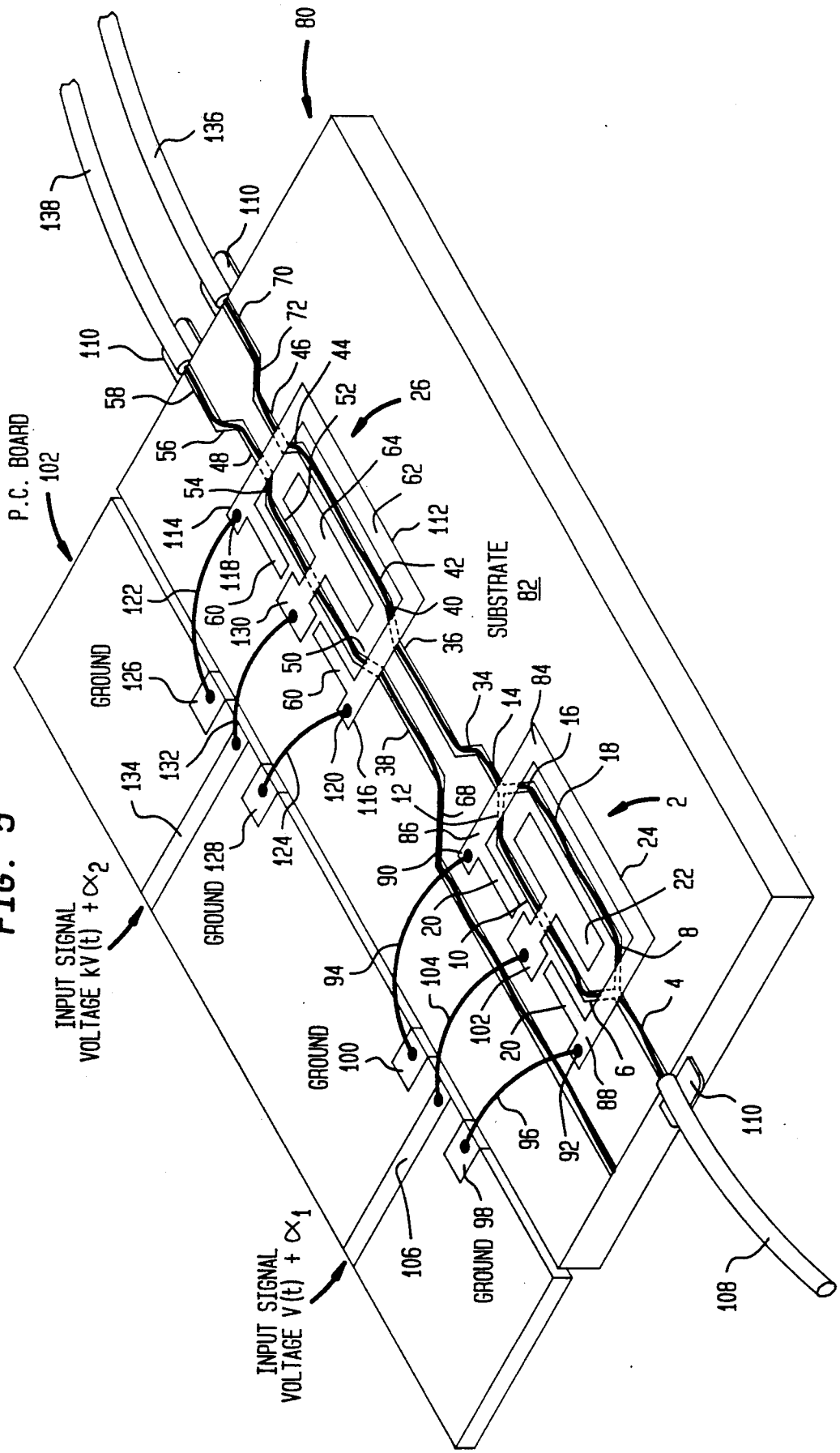
FIG. 5 is a pictorial view of another embodiment of the invention.

In FIG. 5, a simplified pictorial illustration is shown of a two-stage cascaded integrated optical modulator 80 that includes a substrate 82 of lithium niobate crystal, for example. Interferometric modulators substantially similar to modulators 2 and 26 of FIG. 3 are formed in cascade on the substrate. The only difference between the configurations of modulators 2 and 26 shown in FIG. 5, and those of FIG. 3, is that in FIG. 5 the electrodes 20, 22, and 24 are more practically shown for modulator 2, with similar comments applying for the electrodes 60, 62, and 64 of modulator 26. Note that for modulator 22, a substantially U-shaped electrode 84 provides electrode 24 at its base, and electrode 20 in two inwardly projecting segments from the upper portions of arms 86 and 88. The ends of arms 86 and 88 terminate to connector or terminal pads 90 and 92 for connection via conductors 94 and 96, respectively, to ground pads 98 and 100 of an auxiliary printed circuit (PC) board 102, as shown. The U-shaped electrode 84 is formed on top of the substrate 82 over the waveguide segments 6, 8, 12, and 16, as shown. Center electrode 22 is formed by a shortened T-like electrode configuration having a terminal pad 102 for connection via a conductor 104 to a conductor 106 on PC board 102, for receiving an input voltage signal V(t), and a DC bias voltage $\alpha_1$, in this example. A fiber optic cable 108 is coupled via a fiber cable-to-substrate attachment 110 to an end of input waveguide segment 4 of modulator 2, for delivering a light signal thereto.

Similarly, the electrodes for modulator 26 are provided from a relatively U-shaped electrode 112 formed on top of the substrate 82 as shown, for providing electrode 62 at its base, and electrodes 60 from stub-like inwardly projecting electrode portions from the upper ends of the electrode arms 114 and 116. The ends of arms 114 and 116 terminate to connecting pads 118 and 120, respectively, for connection via conductors 122 and 124 to ground pads 126 and 128 formed on PC board 102 as shown. The center electrode 64 is formed on top of the substrate 82 in a substantially stub-like T-configuration, as shown, where the leg of the T-configuration terminates to a connection pad 130 for connection via a conductor 132 to an end of conductor strip 134 on PC board 102, for receiving an input signal $k \cdot V(t)$ and a DC bias $\alpha_2$. A light fiber cable 136 is connected via a fiber cable-to-substrate attachment or connector 110 to the end of output waveguide segment 70, for receiving the primary light output signal $P_{(t)}$. In certain applications, it may be desirable to use a secondary light output signal that is available from the end of waveguide segment 58 as a monitoring light output signal for purposes of control. To do this, another fiber optic cable 138 is connected via a connector 110 to the end of waveguide 58.

Note that, as mentioned above, for modulator 2 waveguide segments 6, 10, and 12 may be taken jointly as providing an upper waveguide forming a continuous waveguide with input segment 4 and output segment 14; and waveguide segments 8, 18, and 16 may be taken as a continuous lower waveguide in conjunction with input waveguide segment 4 and output waveguide segment 14. Similarly, waveguide segments 50, 52, and 54 of modulator 26 form a continuous upper waveguide, whereas waveguide segments 40, 42, and 44 form a continuous lower waveguide.

The cascaded interferometric modulator of FIG. 5 operates generally as described for the substantially similar configuration of FIG. 3. More specifically, the Y-branch interferometric modulator 2 modulates the light input signal $P_0$ in a nonlinear manner, causing the output light waveform provided in waveguide segment 14 to be nonlinear, typically approximating a cosine function. This modulated output signal is then conducted via waveguide segment 34 into the coupler switch interferometric modulator 26, for modulating the light wave by a modulating voltage $kV(t)$, as shown in FIG. 5. The ultimate modulated light output signal $P_{(t)}$ delivered to output waveguide segment 70 is a product of the modulation of the input light wave signal $P_0$ by both modulators 2 and 26. Modulator 26 also modulates light signals in a nonlinear manner. By appropriate adjustment of the level of the DC bias $\alpha_1$ applied to modulator 2, and the DC bias $\alpha_2$ applied to modulator 26, it is possible to obtain cancellation or minimize the product terms, as previously described. By proper adjustment also of the modulating voltage $V(t)$ applied to modulator 2, and $k \cdot V(t)$ applied to interferometric modulator 26, along with adjustment of the previously mentioned DC biases, but primarily by adjustment of the DC biases, certain of the product terms can be effectively zeroed out.

If a two-stage cascaded interferometric modulator using the configuration of FIG. 4 is similarly fabricated as the integrated modulator 80 of FIG. 5, the former may require different levels of DC biasing voltages and a different ratio k between the modulating voltages, in order to optimize the linearity of the resultant output signal $P_{(t)}$. Also, as previously mentioned, the embodiment of FIGS. 3 and 5 is preferred, in that the embodiment of FIG. 4 includes a Y-branch in the output stage 72 that tends to absorb components of light in phase quadrature, whereas the output stage 26 of the embodiments of FIGS. 3 and 5 does not absorb light, thereby permitting more light to pass through.

Note that in the embodiment of the invention shown in FIG. 5, the DC bias voltages $\alpha_1$ and $\alpha_2$ are shown applied in combination with respective modulating voltages to inner electrode 22 of modulator 2, and inner electrode 64 of modulator 26, respectively. However, in other configurations, the DC bias voltages $\alpha_1$ and $\alpha_2$ may be applied to modulators 2 and 26 through separate and independent terminal pads and electrodes independent of the modulating voltage input connections. The fabrication of such an alternately configured cascaded modulator device, however, may be more complicated than that of FIG. 5.

Figure 6:
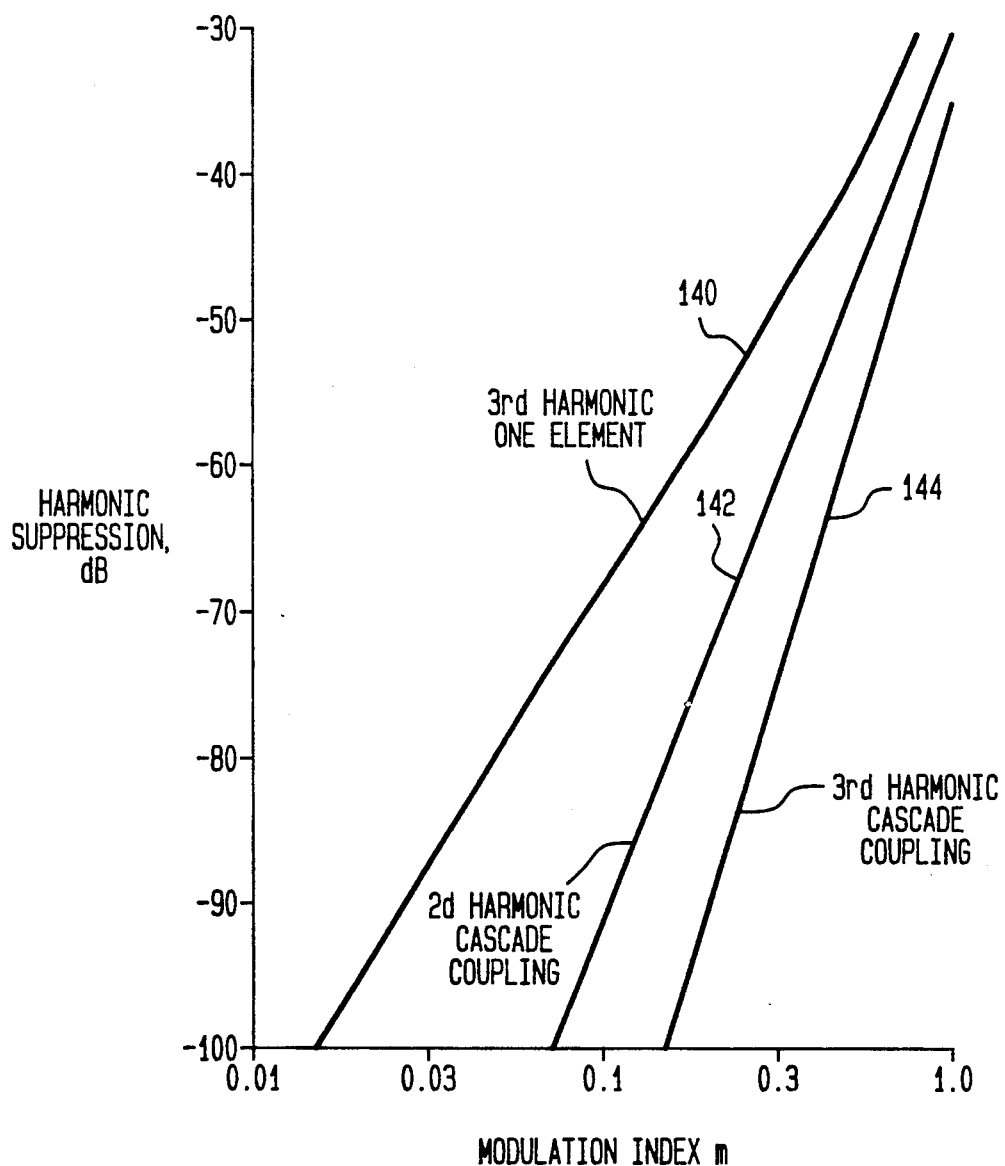
FIG. 6 is a curve of harmonic suppression plotted against a modulation index m, for a known interferometric modulator compared against an integrated interferometric modulator of one embodiment of the invention.

In FIG. 6, a comparison is shown of the harmonic generation in a known single element interferometric modulator with a DC bias set to zero is compared to a two-element cascade coupling of the present invention, for a single frequency input signal $V(t) = V_0 \sin \omega t$. The harmonic suppression is plotted against the modulation index m, with the former being given in dB. Curve 140 shows the third harmonic generation for a single element interferometric modulator. Curve 142 shows the second harmonic generation for a cascaded interferometric modulator 80, and curve 144 shows the third harmonic generation for the latter. As shown, for the third harmonic, there is about a 40 dB improvement for a modulation index m of about 14.0% in harmonic suppression, when using the cascaded coupled interferometric modulator 80 versus a single interferometric modulator such as 2 or 26, for example.

As previously indicated in describing the cascaded configurations for FIGS. 3 and 4 for integrated interferometric modulators, up to a practical limit, n stages of such modulators 2, 26, and 72 can be cascaded together in some predetermined combination for providing a minimization of nonlinearities, to in effect maximize the linearity of the modulated output signal $P_{(t)}$. The objective is to cancel or substantially reduce harmonics in $P_{(t)}$.

Although various embodiments of the invention have been illustrated and described herein, they are not meant to be limiting. Those skilled in the art may recognize modifications to these various embodiments, whereby such modifications are meant to be covered by the spirit and scope of the appended claims. For example, in the embodiment of FIG. 3, modulator 26 can serve as the input stage, and modulator 2 as an output stage. Similarly, in FIG. 4, modulator 73 can serve as the input stage, and modulator 2 as the output stage.

What is claimed is:

1. An integrated electro-optical modulator for providing a linearly modulated light signal, comprising:
   a substrate;
   a plurality of Mach-Zehnder type interferometric modulators formed on said substrate and coupled in cascade, each of said modulators including a plurality of electrode means for continuous connection to a source of reference potential, for receiving a modulating voltage, and for continuous connection to a DC bias voltage, respectively;
   a first one in a chain of said cascaded modulators further including an input waveguide segment for receiving an input light signal; and a last one of the chain of said cascaded modulators including an output waveguide segment providing an output light signal, whereby the levels of said DC bias voltages are predetermined for maximizing the linearity of a modulated output light signal.

2. The integrated electro-optical modulator of claim 1, wherein said plurality of modulators include:
a Y-branch type interferometric modulator serving as an input stage; and
a coupler structure type interferometric modulator serving as an output stage.

3. The integrated electro-optical modular of claim 2, wherein said coupler structure type interferometric modulator includes an input coupler and an output coupler for receiving and outputting light signals, respectively, whereby waveguide segments forming said input and output couplers are configured for maximizing the linearity of said modulated output light signal.

4. The integrated electro-optical modulator of claim 3, further including a means for adjusting the ratio of the amplitudes of said modulating voltages applied to said Y-branch interferometric modulator and said coupler structure interferometric modulator, for maximizing the linearity of said output signal.

5. The integrated electro-optical modulator of claim 1, further including a means for individually adjusting the amplitudes of said modulating voltages for maximizing the linearity of the modulated output signal.

6. The integrated electro-optical modulator of claim 1, wherein said plurality of modulators include:
a Y-branch type interferometric modulator serving as an input stage; and
a 2X1 coupler switch type interferometric modulator output stage.

7. The integrated electro-optical modulator of claim 6, wherein said 2X1 modulator includes a coupler type input waveguide configured in a manner for maximizing the linearity of said modulated output light signal.

8. The integrated electro-optical modulator of claim 1, wherein said plurality of Mach-Zehnder type interferometric modulators includes a combination of cascaded Y-branch type and coupler structure type interferometric modulator stages.

9. The integrated electro-optical modulator of claim 1, wherein said plurality of Mach-Zehnder type interferometric modulators includes a combination of cascaded Y-branch and 2X1 switch type interferometric modulator stages.

10. The integrated electro-optical modulator of claim wherein said plurality of Mach-Zehnder type interferometric modulators includes a combination of cascaded coupler structure type, Y-branch type, and 2X1 switch type interferometric modulators.

11. In an integrated electro-optical modulator for providing a linearly modulated light signal, a method for maximizing the linearity thereof comprising the steps of:
forming a first Mach-Zehnder type interferometric modulator on a substrate as an input stage;
forming a second Mach-Zehnder type interferometric modulator on said substrate as output stage coupled in cascade with said first modulator;
applying first and second modulating voltages to said first and second modulators, respectively;
continuously applying first and second DC bias voltages to said first and second modulators, respectively; and
adjusting the levels of said first and second DC bias voltages, for maximizing the linearity of said integrated electro-optical modulator.

12. The method of claim 11, further including the step of adjusting the ratio of the amplitudes of said first and second modulating voltages for maximizing the linearity of said integrated electro-optical modulator.

13. The method of claim 12, further including the steps of:
configuring said first interferometric modulator as Y-branch type; and
configuring said second interferometric modulator as a coupler-structure type having input and output couplers.

14. The method of claim 12, further including the step of predetermining the configuration of said input and output couplers for maximizing the linearity of said integrated electro-optical modulator.

15. The method of claim 14, further including the step of adjusting the ratio of the amplitudes of said first and second modulating voltages for maximizing the linearity of said integrated electro-optical modulator.

16. The method of claim 12, further including the steps of:
configuring said first interferometric modulator as a Y-branch type; and
configuring said second interferometric modulator as 2X1 switch type having an input coupler.

17. The method of claim 16, further including predetermining the configuration of said input coupler for maximizing the linearity of said integrated electro-optical modulator.

18. The method of claim 17, further including the step of adjusting the ratio of the amplitudes of said first and second modulating voltages for maximizing the amplitude of said integrated electro-optical modulator.

19. The method of claim 12, further including the steps of:
configuring said first interferometric modulator as a coupler-structure type; and
configuring said second interferometric modulator as Y-branch type.

20. The method of claim 12, further including the steps of:
configuring said first interferometric modulator as a 2X1 switch type; and
configuring said second interferometric modulator as Y-branch type.

21. An integrated optical modulator for providing a linearly modulated light signal, comprising:
a cascade of optical modulators formed on a substrate, each modulator having a plurality of electrode means for receiving a modulating voltage, and for continuously receiving a bias voltage, respectively; and
means for continuously supplying bias voltage to said electrode means for linearizing a light output from the cascaded optical modulator as a function of said modulating voltage.

22. The integrated optic modulator of claim 21, further comprising a coupling means for linearizing the light output of the modulator as a function of modulating voltage.

23. The integrated optic modulator of claim 21, further comprising a means for adjusting the modulating voltages to linearize the light output of the modulator as a function of modulating voltage.

* * * * *

UNITED STATES PATENT AND TRADEMARK OFFICE
CERTIFICATE OF CORRECTION

PATENT NO. : 5,148,503
DATED : Sep. 15, 1992
INVENTOR(S) : Skeie

It is certified that error appears in the above-identified patent and that said Letters Patent is hereby corrected as shown below:

<u>Column 11</u>

Line 50: after the word "claim" insert --1,--.

Signed and Sealed this

Eleventh Day of January, 1994

Attest:

BRUCE LEHMAN

Attesting Officer     Commissioner of Patents and Trademarks